INVENTORS.
MICHAEL JOHN ONIFER JR.
ARTHUR ALFRED SMITH
BY

ATTORNEY

United States Patent Office 3,468,346
Patented Sept. 23, 1969

3,468,346
PIPE FITTINGS HAVING AN INNER THERMO-
PLASTIC SURFACE AND AN OUTER
THERMOSET SURFACE
Michael John Onifer, Jr., Elkton, and Arthur Alfred
Smith, Chesapeake City, Md., assignors to American
Cyanamid Company, Stamford, Conn., a corporation
of Maine
Filed Mar. 1, 1966, Ser. No. 530,831
Int. Cl. F16l 9/00, 11/00, 11/12
U.S. Cl. 138—109    5 Claims

ABSTRACT OF THE DISCLOSURE

This invention relates to a plastic pipe fitting having a thermoplastic inner liner and a fiber reinforced thermoset outer layer extending beyond the openings of the fitting so that pipes may be joined with a continuous thermoplastic inner liner.

---

This invention relates to improved plastic pipe fittings and to methods of making them.

For many years there has been a demand for pipes made of plastic rather than metal. They present advantages of lightness, corrosion resistance, and the like. More recently a composite type of plastic pipe has been developed with an inner liner of more or less permanently workable or deformable nature, which is generically referred to in the plastic art as a thermoplastic, and an outer layer of reinforced curable plastic, such as thermo-setting plastics. The reinforcements have usually been glass fiber, although other fibers such as textile fibers have been used. The composite pipe has certain advantages. The thermoplastic liner can be extremely inert; for example, liners made from polyolefins such as polyethylene, polypropylene, polytetrafluoroethylene, and the like show a great chemical inertness to a large number of materials. However, the mechanical strength of the pipe and its stiffness or rigidity leave much to be desired. The reinforced thermo-setting plastic outer layer supplies these needed characteristics. Typical thermo-setting layers are fiber glass reinforced polyesters, polyepoxies and the like. A typical illustration of a composite pipe is shown in U.S. Patent 3,002,534, although for many purposes a somewhat less elaborate fiber glass outer layer is often used.

Severe problems are presented when composite plastic pipes are to be joined with various pipe fittings, such as couplings, elbows, T's, and the like. If fittings are made of thermo-setting resin and fiber glass only, there is no continuous thermoplastic lining and, of course, if the fittings are made of thermoplastic, they do not have the strength and rigidity of the fiber reinforced thermo-setting resins. If it is attempted to make fittings of composite plastic, for example fittings sufficiently over-size so that the inner diameter of their thermoplastic liners is slightly greater than the outer diameter of the reinforced thermo-setting layer of the pipe to which the fitting is attached, bonding problems are presented because the thermoplastic liner does not readily form a completely tight joint to an outer layer of fiber reinforced thermosetting resin. Also, the reinforced thermo-setting resin end of the pipe is exposed and so there is no continuous liner of the highly inert thermoplastic material, which is of importance with certain very corrosive materials.

It is with the solution of these problems that the present invention deals, and it permits pipe coupling with a maximum of corrosion resistance. It is also an advantage that the pipe fittings are all of the strength of composite pipe, in fact part of the fitting is composite; and in the process aspect of the present invention the fittings can be made simply and at reasonable cost. Essentially the present invention forms a pipe fitting of thermoplastic material, preferably substantially thicker than the thermoplastic liner of composite pipe with which the fitting is to be used. The outer diameter of this component of the fitting is substantially the same as the outer diameter of the composite pipe with which it is to be used. It is a simple matter to produce the necessary shapes by injection molding or other well-known, conventional methods. After the thermoplastic body of the fitting is made, plugs are inserted in its openings, two in the case of a coupling or elbow, three in the case of a T, and these plugs are provided with a shoulder or are tapered so that beyond the fitting is substantially the same as the outer diameter of the composite pipe with which the fitting is to be used. The plugs are coated with a material which does not adhere to reinforced thermo-setting resin on curing. To simplify the further description, this will be described in terms of fiber glass reinforced plastic, which is the most common and is a typical material. Of course, the invention is not limited to this particular type of thermo-setting material. The coating of the plug is of such nature that it acts as a parting agent or layer and it may, of course, be in the form of a suitable wound thermoplastic ribbon which does not adhere to fiber glass on curing.

The pipe fitting bodies with the protruding plugs then receive a layer or layers of resin impregnated fiber glass. This may be effected in many ways, all of which are conventional, such as winding of tape impregnating with the thermo-setting monomer or plastic polymer, or the tape may be preimpregnated. A preferred method which forms a part of a more specific preferred modification of the present invention involves the use of knit reinforcing fabric, for example of glass fiber, which is stretched over the fitting and the plugs, an additional hole being provided in the case of T fittings. The knit material surrounds the fitting tightly and is then impregnated with the curable resin and, finally, the reinforced resin layer or layers are cured or thermo-set in the conventional manner, as in the case of a composite pipe.

It is an advantage of the present invention that standard curing techniques can be used, care being taken of course to match the curing conditions, such as temperatures, to the characteristics of the thermoplastic material. It is also possible to cure in stages, first at a lower temperature and then at a higher. All of these curing procedures are well known in the art and are not changed when used in the present invention. It is common in composite pipe formation to use thin coatings of materials on the thermoplastic liners which form a mutual bond to the fiber glass. This can be done also in the case of the present invention in producing the new fittings which constitute the product aspect of the present invention.

After curing, the plugs are removed and now the fittings have extensions of the fiber glass only; and when slid over composite pipe, preferably with a thin layer of cement, the thermoplastic inner portions of the fittings and the pipe butt against each other and form a tight joint, so that there is a continuous thermoplastic layer. There is thus not presented an edge of fiber glass as in the case of prior composite fittings, and so there is no corrosion problem and no problem of a firm and perfect bond between fitting and pipe. Where the corrosion problem is particularly severe, a thermoplastic, and somewhat resilient, annular washer or O-ring may be placed in the ends of the fitting after the plugs have been withdrawn; and this permits an even more perfect joint when a composite pipe is joined to the fitting. The action of the washer performs the dual function of a gasket and a completely continuous thermoplastic inner liner surface. The use of the relatively soft thermoplastic washers is of importance where maximum tightness and corrosion resistance is essential and so may be considered as a more specific modification of the present invention.

The invention will be described in greater detail in conjunction with the drawings, in which.

An inner thermoplastic fitting shape 1 is produced, for example by injection molding of polypropylene or other thermoplastic such as polyvinyl chloride. Plugs 2 are then inserted and are shaped so that in the portion that does not enter the openings of the fitting, and which is shown at 4, is substantially the same as the outer diameter of a composite pipe with which the fitting is to be used.

Figure 1:
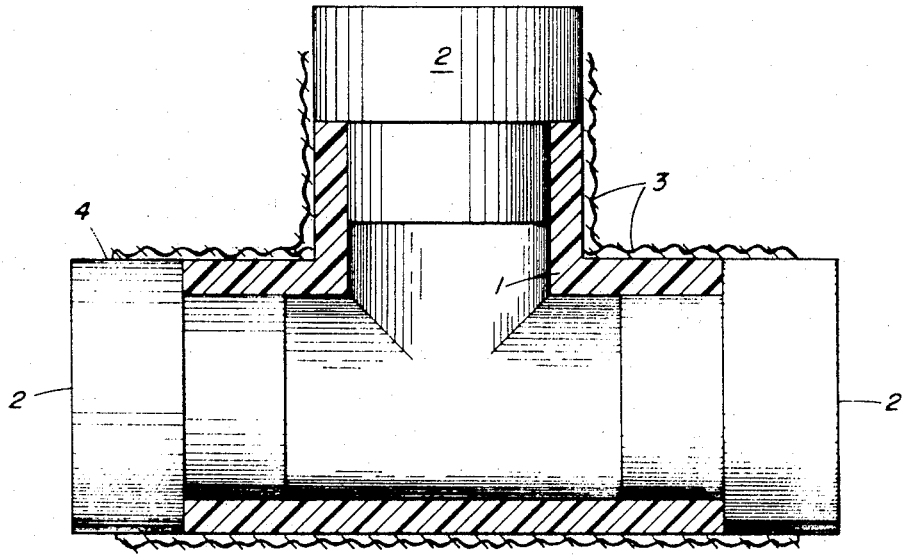
FIG. 1 is a section through a T fitting with plugs in place.

A cylinder of knitted fiber glass fabric 3 is then stretched over the thermoplastic fitting, an opening being provided of course for the T, and is then impregnated with an epoxy composition with a suitable catalyst and the whole body is then cured at a suitable temperature to cause the epoxy to set, forming a fiber glass reinforced layer over the thermoplastic body of the fitting with extensions of the epoxy fiber glass only over the plugs 2. If desired, the thermoplastic fitting may be coated with a thin coating of material which bonds to the thermoplastic and to the epoxy fiber glass on curing. This bonding is a conventional operation and is so thin that it is not effectively shown in the drawings. FIG. 1 shows only the knitted fiber glass fabric and represents the fitting before impregnation with epoxy and curing.

Figure 2:
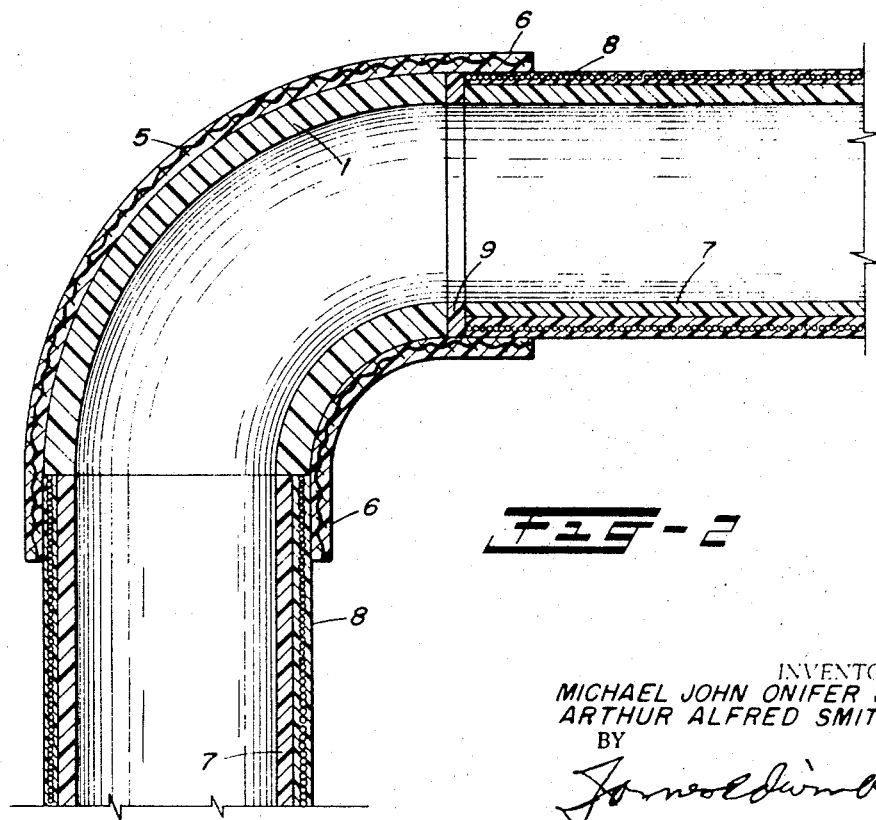
FIG. 2 is a section through an elbow showing the fitting joined to a composite pipe.

FIG. 2 shows an elbow, in which the same materials bear the same reference numerals, attached to a piece of composite pipe. As this is a finished article, the fiber glass reinforced epoxy is shown in the form of the final layer at 5 with the projecting portions that were over the plugs shown at 6. A composite pipe with an inner thermoplastic layer 7 bonded to fiber glass reinforced cured epoxy 8 is shown as inserted in the portion 6 of the fitting with a soft, somewhat resilient, thermoplastic washer 9 serving as a gasket. The other end of the elbow is shown without the washer 9, which illustrates the other modification and avoids unnecessary duplication of figures in the drawing.

As has been described above, the use of the knitted reinforcing fabric, such as fiber glass, is the preferred modification of the present invention; but other known methods, such as wrapping with tape and the like, may be used. FIG. 2 illustrates a section and thus the layer 5 has the same appearance in the section regardless of the method by which it was formed.

Before introducing the composite pipe, in FIG. 2, the end is preferably coated with a thin adhesive, such as for example a thin epoxy adhesive, which does not show on the drawing and which is a conventional operation in any event. However, the present invention permits a strong bond between the outer layer of fiber glass reinforced epoxy on the pipe and the similar, but somewhat larger diameter extension 6, whereas if it is attempted to use composite pipe fittings it is difficult to obtain good bonding between the inner thermoplastic layer and the outer reinforced thermo-setting layer on the pipe.

It will be noted that the present invention is a new pipe fitting structure and a new method of making it, but does not require new resins. The ones mentioned are typical, but any other thermoplastic or thermo-setting resins may be used and, of course, the glass fibers may be replaced with other reinforcing fibers.

We claim:

1. A composite plastic pipe fitting for use with composite pipe having a thermoplastic inner liner and a fiber reinforced cured thermoset outer layer comprising in combination, (a) a thermoplastic body portion of the pipe fitting,
   (b) a fiber reinforced curable layer surrounding said thermoplastic body and extending for a substantial distance beyond the openings of the pipe fitting body whereby composite pipes may be joined to the fitting with an abutting continuous thermoplastic inner liner.

2. A pipe fitting according to claim 1 in which the reinforcing fiber for the thermoset resin is glass.

3. A pipe fitting according to claim 2 in which the glass reinforcement is in the form of a knitted glass fabric.

4. A pipe fitting according to claim 2 in which the thermoplastic body is a polyolefin.

5. A pipe fitting according to claim 2 in which the glass reinforces a polyepoxy thermoset resin.

References Cited

UNITED STATES PATENTS

| | | | |
|---|---|---|---|
| 2,614,058 | 10/1952 | Francis | 138—153 XR |
| 2,782,806 | 2/1957 | Stambaugh et al. | 138—109 |
| 2,857,931 | 10/1958 | Lawton | 138—149 XR |
| 2,894,538 | 7/1959 | Wilson | 138—109 XR |
| 2,991,808 | 7/1961 | Siegmann | 138—141 |
| 3,026,228 | 3/1962 | Robinson et al. | 156—309 |
| 3,030,253 | 4/1962 | St. John et al. | 156—196 |
| 3,378,282 | 4/1968 | Demler | 285—45 XR |
| 3,402,731 | 9/1968 | Martin | 138—149 XR |

LAVERNE D. GEIGER, Primary Examiner

HENRY K. ARTIS, Assistant Examiner

U.S. Cl. X.R.

285—45

UNITED STATES PATENT OFFICE
CERTIFICATE OF CORRECTION

Patent No. 3,468,346  September 23, 1969

Michael John Onifer, Jr., et al.

It is certified that error appears in the above identified patent and that said Letters Patent are hereby corrected as shown below:

Column 2, line 14, "is substantially the same as the outer diameter" should read -- their outer diameter corresponds with that --.

Signed and sealed this 20th day of October 1970.

(SEAL)
Attest:

Edward M. Fletcher, Jr.
Attesting Officer

WILLIAM E. SCHUYLER, JR.
Commissioner of Patents